United States Patent [19]

Garombo

[11] Patent Number: 4,966,058

[45] Date of Patent: Oct. 30, 1990

[54] AUTOMATIC THREADING DEVICE FOR LATHES

[76] Inventor: Michele Garombo, 91 Barstow St., Providence, R.I. 02909

[21] Appl. No.: 251,516

[22] Filed: Sep. 30, 1988

[51] Int. Cl.$^5$ .......................... B23B 25/00; B23B 3/28
[52] U.S. Cl. ........................................ 82/154; 82/132; 82/133; 82/137; 82/139; 82/153
[58] Field of Search ................. 82/5.5, 5, 14 C, 14 R, 82/14 A, 34 R, 34 A, 34 B, 34 D, 22, 23, 24 A, 132, 133, 137, 139, 154, 153

[56] References Cited

U.S. PATENT DOCUMENTS

2,593,310  4/1952  Johnson ............................... 82/14 A
2,903,933  9/1959  MacKenzie ............................. 82/23

*Primary Examiner*—Frederick R. Schmidt
*Assistant Examiner*—Jack W. Lavinder

[57] ABSTRACT

An automatic threading device, applicable to engine lathes or turret lathes, operating with a single point tool traveling parallel to the longitudinal axis of the lathe in a series of passes, generating the thread on a workpiece by synchronizing the travel of the device with the turning of the lathe, as in ordinary lathe threading, but in fully automatic sequences, reducing threading time to a few percent of that of conventional methods. A wide range of diameters, lengths, and thread pitches can be accommodated by one device. Except for a drive screw which provides longitudinal movement of the tool, all operating functions are pneumatically controlled. The device may be adapted for either temporary or semi-permanent attachment to a lathe.

2 Claims, 7 Drawing Sheets

AUTOMATIC THREADING DEVICE FOR LATHES

BACKGROUND OF THE INVENTION

1. Field of the Invention

The present invention relates to threading devices generally and, more particularly, to an automatic threading device which may be temporarily or semi-permanently mounted on a turret or engine lathe and which can accommodate a wide range of threading functions with only relatively minor changes.

2. Background Art

There are a number of devices for forming threads on parts, whether the treads be external or internal, each method having its advantages according to the final product. Well known are the common manual taps and dies, each diameter and/or pitch of thread requiring its own tap and/or die. Threads may also be formed by stamping or casting. Thread rolling with flat or cylindrical dies is extensively used for mass production of screws and bolts. Thread milling is used in many instances, but the method requires expensive equipment.

The ordinary lathe can be used to accomplish almost any threading job by combining the rotation of the lathe with the synchronized feeding of a single pointed tool, generating the thread with no limitation of pitches, diameters, inside or outside, cylindrical or taper, and in any form of the thread itself. This method is slow and is typically used to manufacture replacement parts or a limited quantity of parts.

Automatic or semi-automatic production machines may be found in manufacturing operations, which machines are dedicated to producing threaded parts and are usually set up to produce a single threaded part for a relatively long production run and then may be modified to produce another threaded part. These machines offer the advantages of lathe threading methods with high speed and automatic cycling. The machines are very efficient, but come at a very high price not affordable to small and medium size operations.

Parts with threads against a flange or shoulder cannot be made with dies. Long shafts with two or more threads of different diameters and/or pitches are difficult, usually impossible, to produce with dies.

In my U.S. Pat. No. 3,016,777, issued Jan. 16, 1962, I describe a threading device for temporary attachment to a lathe, which device is semi-automatic in that it automatically moves a cutting tool back and forth parallel to the longitudinal axis of a part being threaded, but transverse advancement of the tool into the part is manual. In my Italian Patents Nos. 532273, issued Aug. 18, 1955, and 535380, issued Nov. 10, 1955, I describe improvements to that device wherein transverse feed is also automatic. While those patented devices have proved to be extraordinarily effective in providing a threading device which uses the mechanisms of the lathe itself to provide a wide range of types of threads. Such devices operate with a variety of gears, cams, ratchets, springs, and levers which contribute to slowness and which take a great deal of power to operate. Those devices are also relatively large and expensive and have a relatively low capacity.

Accordingly, it is a principal object of the present invention to provide a threading device for temporary or semi-permanent attachment to a lathe, which device can produce threads having a wide range of diameter, pitches, and lengths.

Another object of the invention is to provide such a device that is relatively compact and less expensive.

An additional object of the invention is to provide such a device that can be quickly mounted in position on the lathe.

A further object of the invention is to provide such a device in which changeover from one thread diameter, pitch, and/or length can be made quickly and easily.

Other objects of the invention, as well as particular advantages and features thereof will, in part, be obvious and will, in part, be apparent from the following description and the accompanying drawing figures.

SUMMARY OF THE INVENTION

The above objects, among others, are accomplished by providing an automatic threading device, applicable to engine lathes or turret lathes, operating with a single point tool traveling parallel to the longitudinal axis of the lathe in a series of passes, generating the thread on a workpiece by synchronizing the travel of the device with the turning of the lathe, as in ordinary lathe threading, but in fully automatic sequences, reducing threading time to a few percent of that of conventional methods. A wide range of diameters, lengths, and thread pitches can be accommodated by one device. Except for a drive screw which provides longitudinal movement of the tool, all operating functions are pneumatically controlled. The device may be adapted for either temporary or semi-permanent attachment to a lathe.

DESCRIPTION OF THE PREFERRED EMBODIMENTS

Referring now to the Drawing figures in which like elements have the same identifying numerals throughout the various figures, there is shown a threading device according to the present invention, generally indicated by the reference numeral 10.

Threading device 10 includes a base plate 12 which is mounted on a support plate 14. Threading device 10 is positioned longitudinally with respect to a workpiece 16 by sliding support plate 14 on a dovetailed support 18. Transverse adjustment is made by sliding base plate 12 on a guide 20 by means of a screw 22 and its associated handle 24 and locking the base plate with clamps 26. Threading device 10 includes a longitudinal carriage 28 which is guided along support guide 30 fixed to base plate 12, and a transversal carriage 32 which slides on a dovetail 34.

A first pneumatic cylinder 36 is fixedly mounted to support guide 30 and the piston 38 thereof is connected to longitudinal carriage 28 to move the carriage longitudinally. A second pneumatic cylinder is fixedly mounted to longitudinal carriage 28 and the piston 42 thereof is rotatably connected to hinged lever 44 to cause engagement or disengagement of a roller 46 with a screw 48, the screw being fixedly mounted with respect to base plate 12 and having its longitudinal axis parallel to the longitudinal direction of movement of longitudinal carriage 28. A third pneumatic cylinder 50 is fixedly mounted to longitudinal carriage 28 and the piston 52 thereof is rotatably connected to a hinged lever 54 which engages transversal carriage 32 so as to move the carriage transversely.

Fixedly mounted on transversal carriage 32 is a turret post 56 to which is removably attached a tool holder 58 carrying a cutting tool 60. Cutting tool 60 may have any profile depending on the shape of the thread to be cut. Tool holder 58 may be mounted at the end of turret post 56, as shown, for cutting external threads or it may be mounted at the side of the turret post for cutting internal threads.

Figure 5:
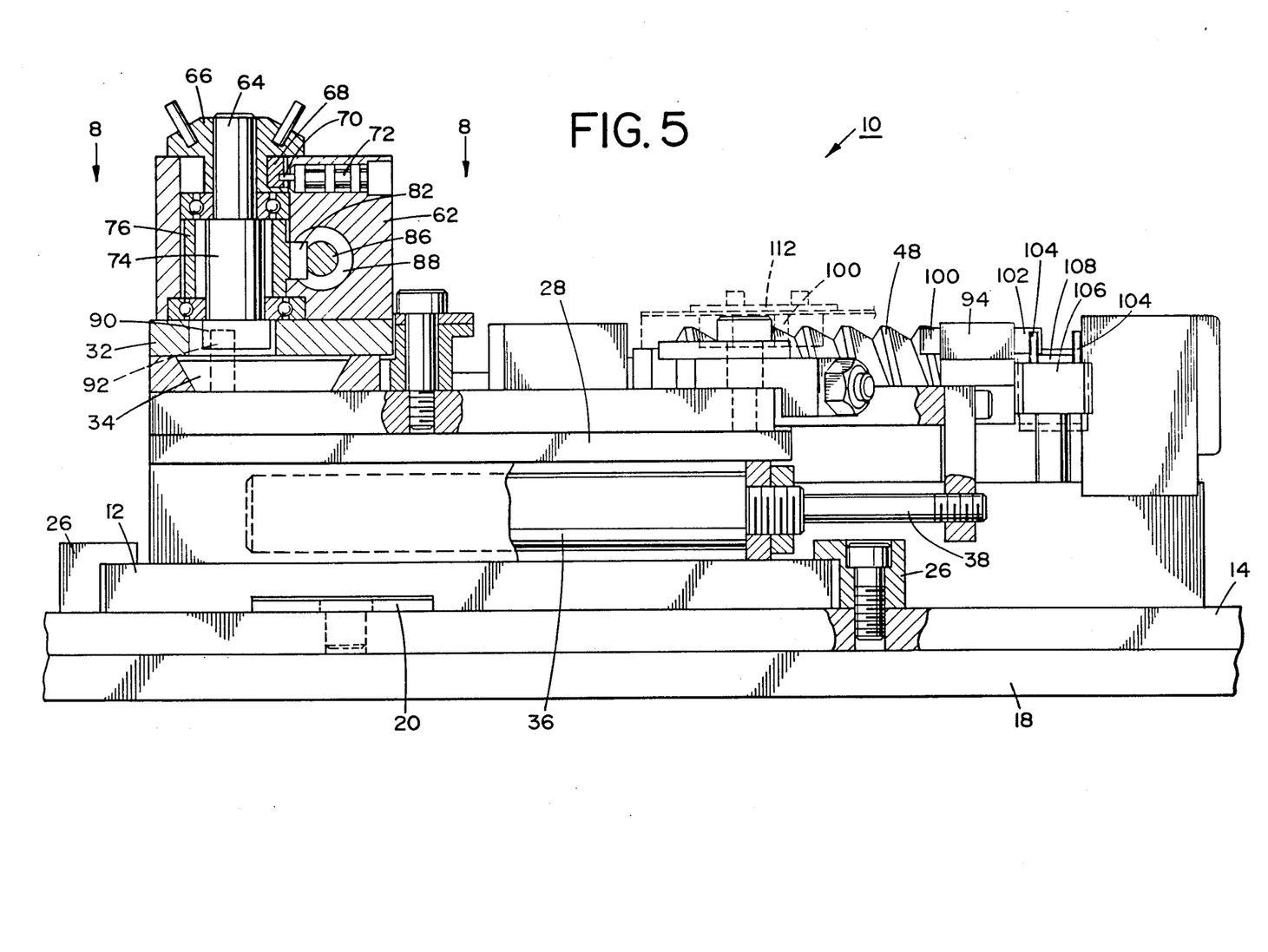
FIG. 5 is a partial side elevation view, partially in cross-section, of the assembly of FIGS. 3 and 4.
Figure 8:
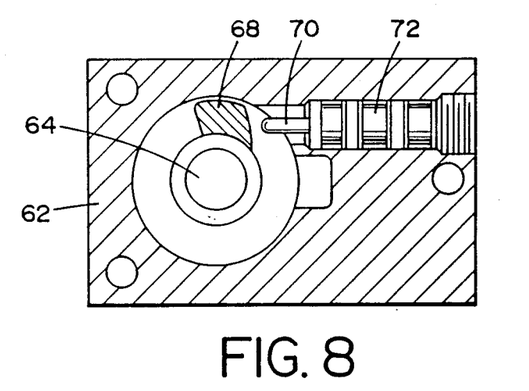
FIG. 8 cross-sectional top plan view detail showing the tackle and valve which terminate threading.

Also fixedly mounted on transversal carriage 32 is housing 62 within which is a vertically disposed shaft 64 journaled within the housing for rotational movement relative thereto. On top of housing 62 is a control knob 66 fixedly attached to shaft 64 and under the control knob within the housing is a tackle 68 (FIGS. 5 and 8) also fixedly attached to the shaft. Tackle 68 is disposed to as to be able to engage and depress a piston 70 of an air valve 72.

A unidirectional clutch 74 is mounted within housing 62 to engage both shaft 64 and an annular ring 76 (FIGS. 2 and 5) in order to transmit clockwise rotational motion of the annular ring to the shaft. Annular ring 76 has a flat surface 78 formed thereon (FIG. 2) disposed so that movement of the annular ring in a counterclockwise direction will cause engagement of the flat surface with the end of a stroke adjustment screw 80. Annular ring 76 also has formed thereon a cam 82 which rotatingly engages an annular groove 84 formed on a piston 86 in a fourth cylinder 88. It can be seen that stroke adjustment screw 80 may be used to permit limiting the length of travel of piston 86.

Figure 7:
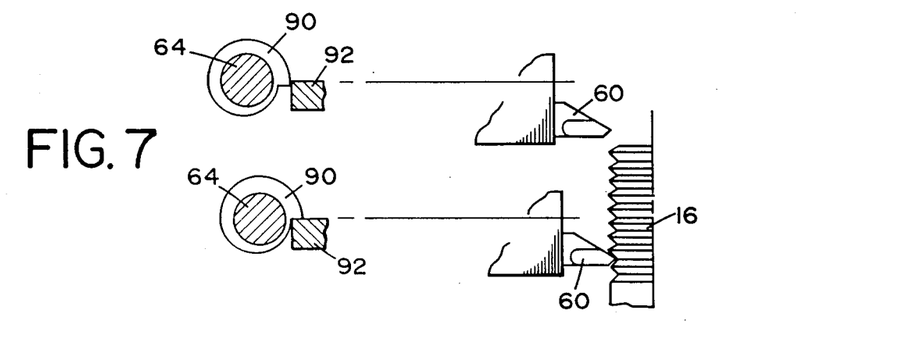
FIG. 7 is a schematic top plan view detail showing the relationship of the cam, the cam stop, and the cutting tool, of a threading device constructed according to the present invention.

At the bottom of shaft 64 is fixedly mounted a circular cam 90 which engages a cam stop 92 and limits the depth of cut of cutting tool 60 into workpiece 16 (FIG. 7). Cam stop 92 is fixedly mounted with respect to longitudinal carriage 28.

Figure 1:
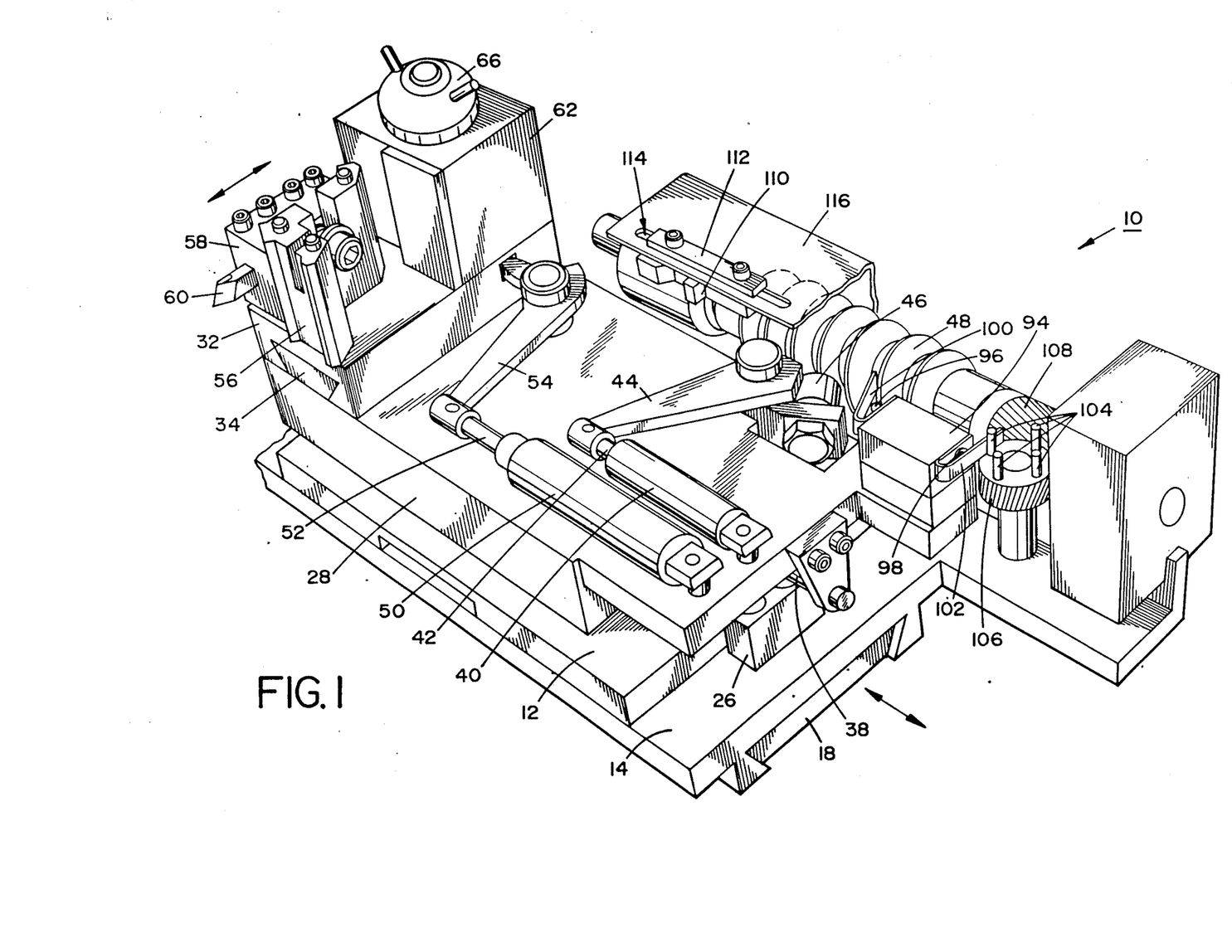
FIG. 1 is a perspective view of a threading device constructed according to a preferred embodiment of the present invention.

Completing the pneumatic control system is master valve 94 which is fixedly mounted to longitudinal carriage 28 and which has two pistons 96 and 98 depressible by operating levers 110 and 102, respectively. (For greater clarity, the pneumatic tubing connecting the various pistons and valves as well as air inlets and outlets and the air supply tubing has not been shown on the drawing figures, as the configuration thereof would be obvious to one skilled in the art with reference to FIG. 6.) As shown on FIGS. 1, 2, and 5, operating lever 102 has engaged one of upright pins 104 fixedly mounted on a pin gear 106 rotatably mounted as shown to be driven by a worm 108 formed on screw 48. Operating lever 100 is engagable (not shown) by a master valve stop 110 which is a part of an adjustable stop slide 112 which may be selectively positioned in slot 114 formed in a cover plate 116 fixed to base plate 12.

Figure 3:
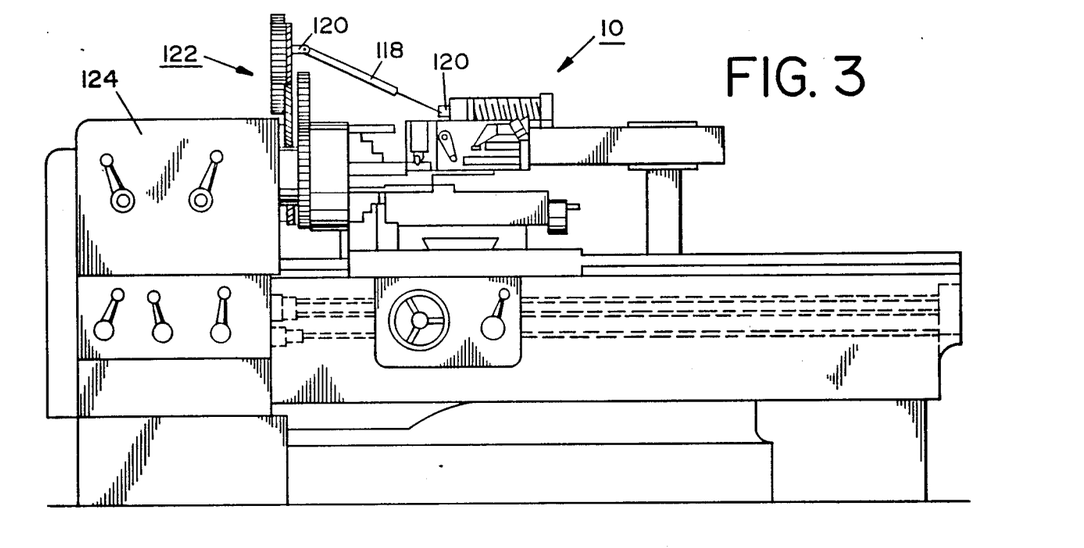
FIG. 3 is a side elevation view of the device of FIGS. 1 and 2 semi-permanently mounted on a lathe.
Figure 4:
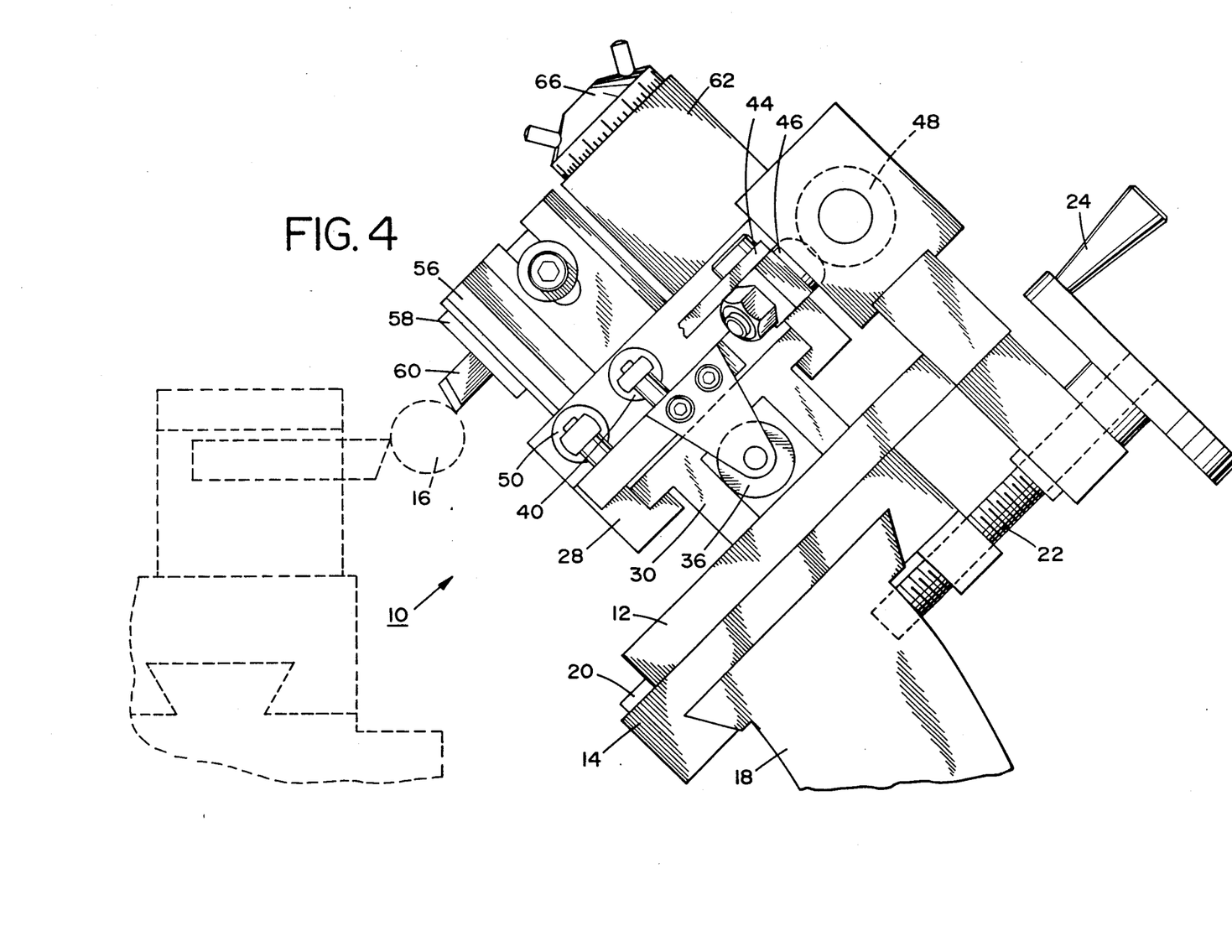
FIG. 4 is a partial side elevation of the assembly of FIG. 3.

In operation, screw 48 is continuously rotated by a telescopic shaft 118 and two universal joints 120 (FIG. 3) which are driven by a set of gears, generally indicated by the reference numeral 122, mounted directly on the spindle of a lathe 124, or on the chuck or the collar of the collets on the lathe. Gears 122 are selected to give the proper pitch to be threaded. It may be assumed that cutting tool 60 has been brought into proper position with respect to workpiece 16 so that the threading operation may commence. The longitudinal pitch generating movement of longitudinal carriage 28 is effected by means of the engagement of roller 46 with screw 48, while all other necessary movements and controls are powered by pneumatic cylinders 36, 40, 50, and 88 and air valve 72.

Engagement of roller 46 with screw 48 through hinged lever 44 is effected by air supply from the left side of master valve 94 (FIG. 6) causing piston 42 to retract into pneumatic cylinder 40, while the right side of the master valve is exhausted to the atmosphere. This air supply also causes piston 52 to retract into pneumatic cylinder 50, thus, through hinged lever 54, keeping cutting tool 60 in contact with workpiece 16; and, this air supply also causes piston 86 in pneumatic cylinder 88 to rotate annular ring 76 counterclockwise until flat surface 78 of the annular ring contacts the end of stroke adjustment screw 80, thus stopping the counterclockwise rotation of the annular ring.

At the end of the selected forward travel of longitudinal carriage 28, operating lever 100 of master valve 94 strikes master valve stop 110, thus depressing piston 96 which causes the left side of master valve 94 (FIG. 6) to exhaust to the atmosphere and causes air supply to come from the right side of the master valve. This latter air supply: causes piston 42 to extend from pneumatic cylinder 40, disengaging roller 46 from screw 48; causes Piston 52 to extend from Pneumatic cylinder 50, moving transversal carriage 32 and cutting tool 62 away from workpiece 16; causes piston 38 to extend from pneumatic cylinder 36, moving longitudinal carriage 28 away from the workpiece and returning the carriage to its starting position; and causes piston 86 in pneumatic cylinder 88 to rotate annular ring 76 clockwise an increment which, through unidirectional clutch 74 causes shaft 64 and therefore circular cam 90 to rotate the same increment. The original starting positions of circular cam 90 and cam stop 92 may be assumed to be as shown on the upper diagram of FIG. 7. When longitudinal carriage 28 has returned to its starting position, one of pins 104 on pin gear 106 strikes operating lever 102, depressing piston 98 on master valve 94 which reverses the flow of air in the control system. The longitudinal carriage again advances toward workpiece 16; however, this time cutting tool 60 cuts deeper into the workpiece by virtue of the increment that circular cam 90 rotated against cam stop 92, thus permitting the deeper cut.

The above cycle is automatically repeated until circular cam 90 and cam stop 92 have reached the relative positions shown on the lower schematic diagram on FIG. 7 where cutting tool 60 has reached the deepest extent of the thread being cut. In the following cycle, cam 90 rotates to reassume the upper position of FIG. 7, thus keeping transversal carriage 32 and cutting tool 60 detached from the work. At this time, tackle 68 (FIGS. 5 and 8) has rotated on shaft 64 so that it will depress piston 70 of air valve 72 (not shown on the figures), thus shutting off the flow of air to fourth cylinder 88 which causes clockwise rotation of annular ring 76 and, therefore, further clockwise rotation of circular cam 90. Consequently, even though longitudinal carriage 32 may continue its back-and-forth cycle, cutting tool 60 will cut no deeper into workpiece 16, but will remain detached form the workpiece ready for the next operation. At this point, further operation of threading device 10 may be terminated, if desired. Workpiece 16 removed from lathe 124 and a new workpiece inserted to repeat the threading operation, if desired.

Figure 6:
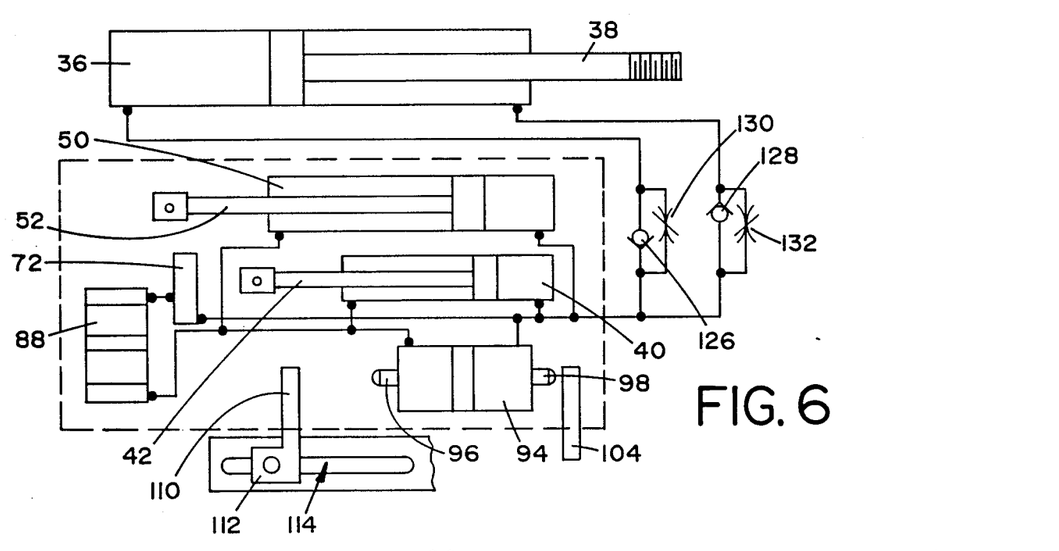
FIG. 6 is a schematic diagram of the pneumatic control system of the present invention.

Referring to FIG. 6, check valves 126 and 128 and flow control valves 130 and 132 are connected as shown in the air supply and discharge lines from first pneumatic cylinder 36 to achieve the following effects: Rapid pressurizing of the left side of first pneumatic cylinder 36 (to move longitudinal carriage 28 away from the workpiece) is accomplished through check valve 126, while the right side of the cylinder receives a small, regulated amount of air pressure through flow control valve 132. When piston 38 reaches the end of its travel, the air on the right side of cylinder 36 has been compressed to the pressure then existing on the left side of the cylinder, thus cushioning the back stroke. Check valve 128 releases the overpressure built up in the right side of cylinder 36, due to the inertia of the longitudinal carriage 28 and the components connected to it.

Forward travel of longitudinal carriage 28 is driven by roller 46 in contact with screw 48 without the assistance of air pressure from master valve 94. Movement of longitudinal carriage 28 pushes piston 38 toward the left end of cylinder 36 and compresses the air there, the pressure of which air is determined by flow control valve 130. Flow control valve 130 is set to keep a relative air pressure there against the travel of piston 38, thus maintaining the roller well in contact with screw 48 to avoid vibrations or overrunning.

Figure 2:
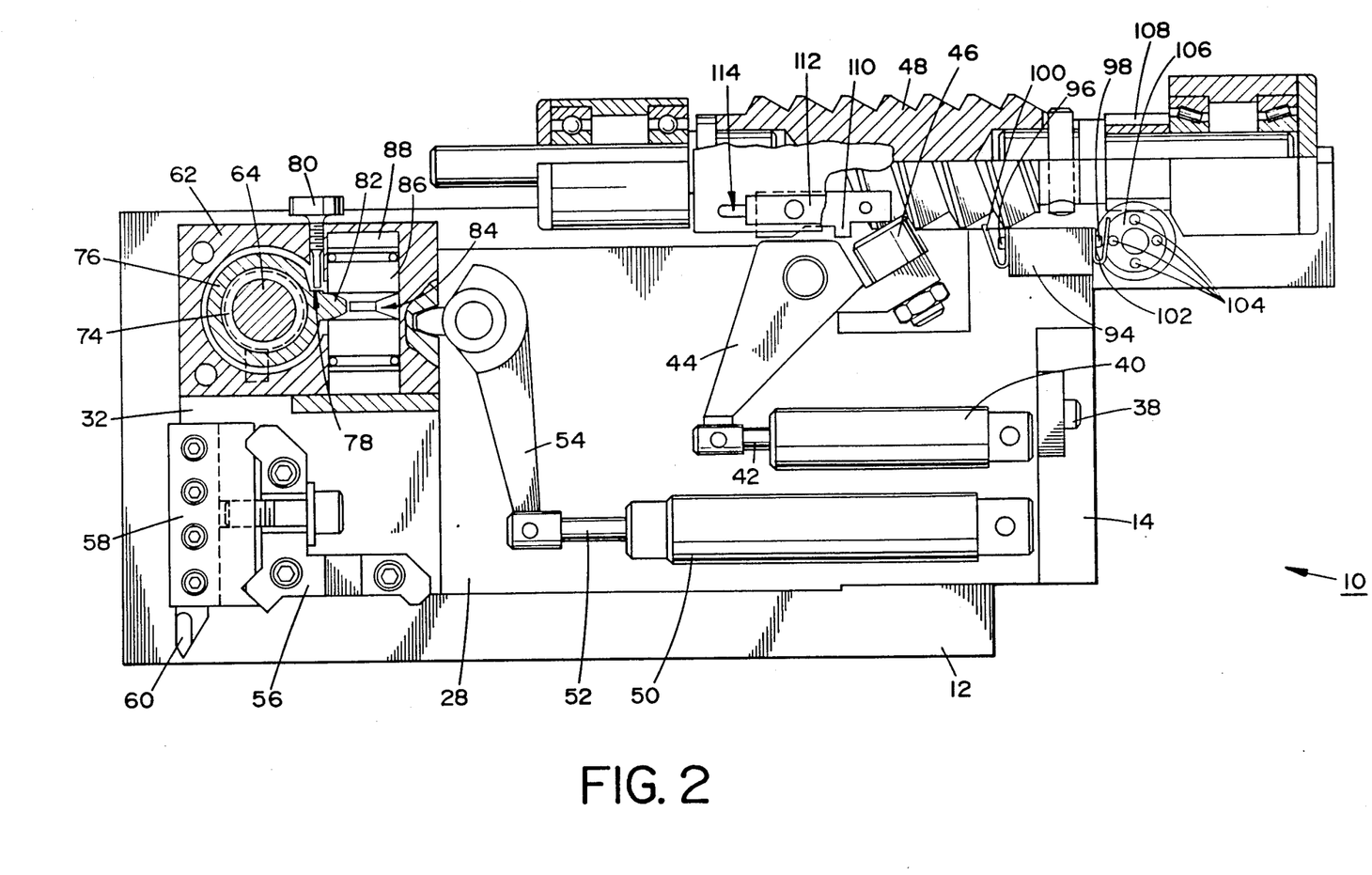
FIG. 2 is a top plan view, partially in cross-section, of the device of FIG. 1.

The extent of travel of piston 86 in fourth cylinder 88 and therefore the extent of each increment of rotation of annular ring 76 and circular cam 90 is determined by the position of stroke adjustment screw 80 (FIG. 2). Thus, when stroke adjustment screw 80 is advanced into housing 62, the increment will be smaller and, therefore, cutting tool 60 will make more shallow cuts and will require more passes to thread workpiece 16. If stroke adjustment screw 80 is more withdrawn from housing 62, cutting tool 62 will take deeper cuts and require fewer passes.

The length of travel of longitudinal carriage in the forward direction and thus the length of the thread to be cut is selected by adjusting the position of stop slide 112 in slot 114.

In order to chase the thread being cut in each subsequent pass of cutting tool 60, the pitch of screw 48 must be an exact multiple of the pitch of the thread being cut. In the embodiment shown, the pitch of screw 48 is preferably 2 threads per inch. In that case, all pitches with an even number of threads-per-inch (TPI), such as 8, 12, 16, are divisible by 2 and the chasing is obtained inherently. Odd TPI are not divisible by 2, of course, and roller 46 must engage screw 48 every other full turn of the screw at the beginning of consecutive passes; otherwise, the thread would be made double. In the case of fractional TPI, such as 11.5 for National Pipe Threads, roller 46 must engage screw 48 every four full turns of the screw at the beginning of consecutive passes.

For the embodiment described, pin gear 106 has 20 teeth and worm 108 has 5 teeth and the pin gear and the worm act as a chaser set on a lathe and ensure that cutting tool 60 engages the groove of the thread being cut in each pass of the cutting tool. Pin gear 106 rotates ¼ revolution for each revolution of screw 48. As described above, pin gear 106 has four upright pins 104, one of which pins, at the end of return travel of longitudinal carriage 28, strikes operating lever 102 to reverse the air supply flow from master valve 94, thus engaging roller 46 with screw 48 and actuating forward travel of the carriage. For an even number of TPI, all four pins 104 are left in position and any one of them can actuate the forward travel because, with an even number of TPI, the thread being cut coincides with screw 48 during each rotation of the screw. For an odd number of TPI, only two opposite pins 104 are left in place and master valve 94 can be activated only every two full turns of screw 48, since the thread being cut coincides with the screw only every two revolutions of the screw, 2 times any odd number of TPI being divisible by 2, the pitch of screw 48. For a fractional number of TPI, only one pin 104 is left in place and master valve 94 can be activated only every four full turns of screw 48. For example, assume that the thread being cut has 11.5 TPI. In that case, the minimum multiple of 11.5 that is divisible by 2, the pitch of screw 48, is 4 times 11.5. Therefore, coincidence of the thread being cut and screw 48 occurs only every four turns of the screw and only one pin 104 is left in place. With odd or fractional TPIs, it is essential that the proper number of pins 104 be left in place or else cutting tool 60 will not engage the groove of the thread being cut on subsequent passes and an unusable multiple thread will be cut.

Figure 9:
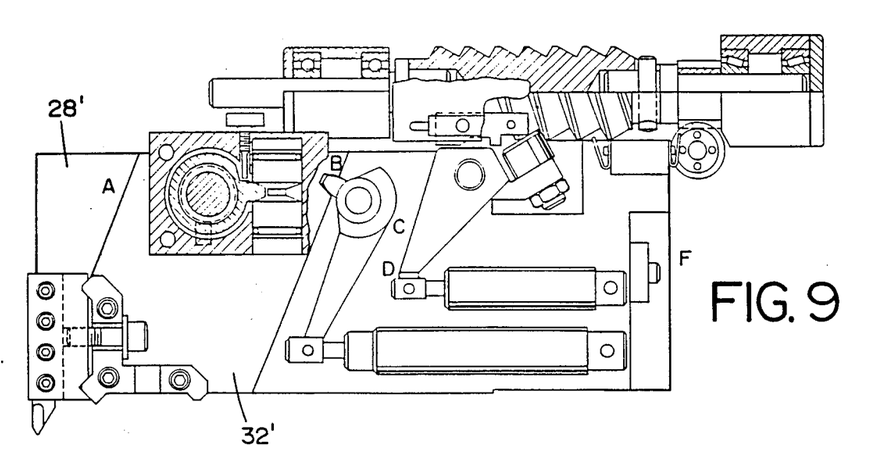
FIG. 9 shows an alternative embodiment of the present invention in which the transversal carriage of the threading device is at an acute angle to the longitudinal axis of the workpiece.
Figure 10:
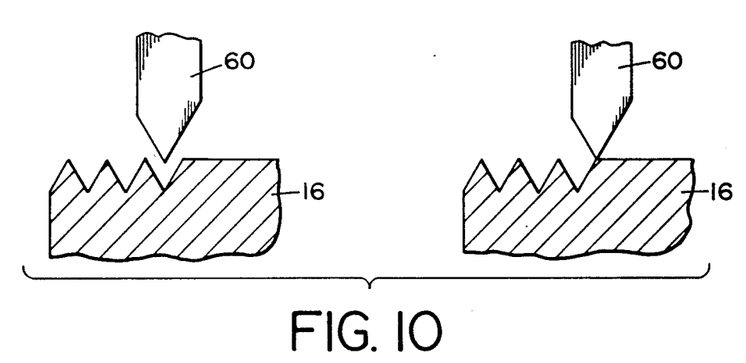
FIG. 10 illustrates the advantage of the embodiment of FIG. 9.

FIG. 9 shows an alternative embodiment of a transversal carriage, according to another aspect of the present invention, here indicated by the reference numeral 32'. Transversal carriage 32' is mounted on a longitudinal carriage 28' for relative movement therewith, generally as described above with reference to transversal carriage 32 and longitudinal carriage 28, except here transversal carriage 32' is offset from quadrature with the longitudinal axis of a workpiece (not shown) by an angle of about 30 degrees to provide an angled infeed. FIG. 10 indicates the advantage of the alternative arrangement of FIG. 9. With orthogonal infeed, it can be understood that two chips are removed and these chips can interfere with each other, sometimes resulting in a poor cut. With an angled infeed, however, only one chip is removed which easily escapes, ensuring a clean cut. The 30-degree infeed also helps to keep the cutting tool sharp longer. In many circumstances, it will be useful to remove threading device 10 from the immediate working area so that other operations may be performed when threading is completed. Such removal, as well as repositioning, locking in place and starting threading at the proper time can all be obtained fully automatically through the use of one or several pneumatic pistons (not shown).

As described above and shown on the related drawing figures, threading device 10 is mounted above the carriage of lathe 124 and doesn't interfere with the ordinary turning operations. A particular advantage of this arrangement is that turning and threading of a workpiece can be accomplished without having to change any apparatus or rehandle the workpiece and, in fact, threading of one portion of the workpiece can be done simultaneously with the turning of another portion of the workpiece. This is of particular advantage when the workpiece is a long shaft being threaded and turned, perhaps with threading of different diameters and/or different thread pitches, since perfect concentricity of the turned and threaded sections is assured.

Figure 11:
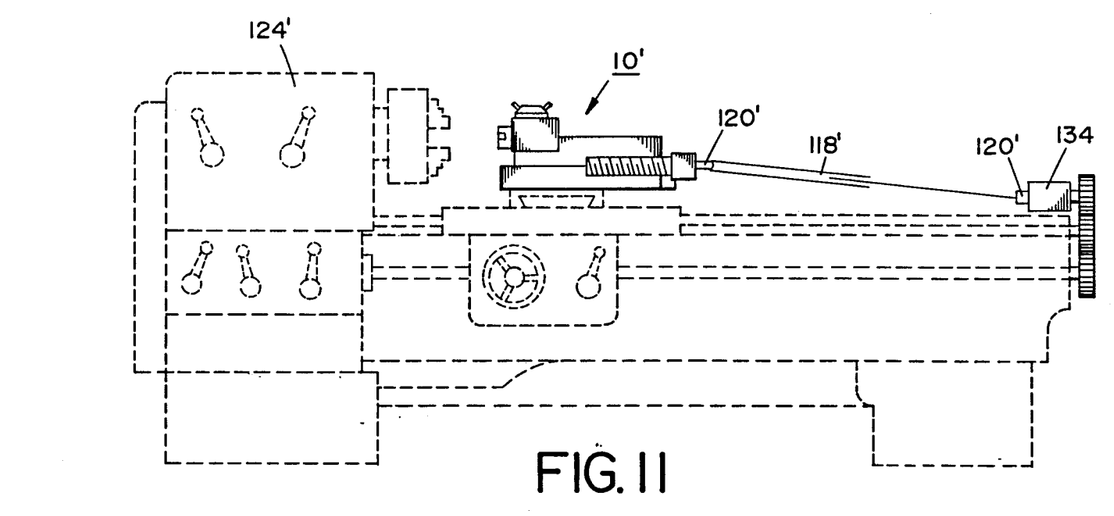
FIG. 11 is a side elevation view of an alternative embodiment of the present invention adapted for temporary mounting on the cross slide of a lathe.
Figure 12:
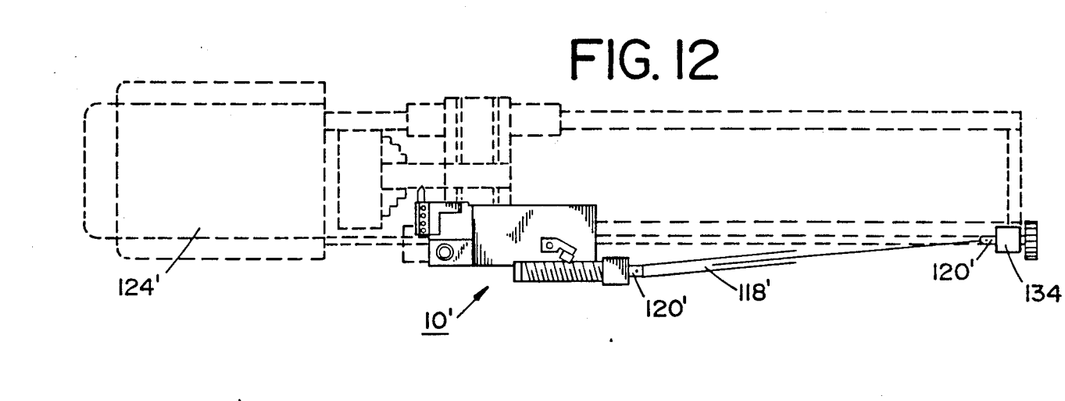
FIG. 12 is a top plan view of the embodiment of FIG. 11.

When only threading operations are intended to be done separately and no turning operations on the workpiece(s) are involved, it may be convenient to use an embodiment of the present invention adapted to be mounted on the cross slide of a lathe, as shown in elevation on FIG. 11 and in plan view on FIG. 12, where the threading device is generally indicated by the reference numeral 10' and the lathe by reference numeral 124'. In this case, threading device 10' is mounted in place of the tool post on the transversal carriage of the lathe and is driven from the change gear box of lathe 124', through the lead screws and set of gears 134', then through telescopic shaft 118' and universal joints 120'. With this embodiment, threading device 10' can be easily installed on lathe 124' in a matter of a few minutes and the supporting structure required for threading device 10 described above as well as the necessity for having a gear train on the spindle of the lathe are eliminated. The change gear box is used to determine the pitch to be threaded.

It will be understood that the threading device disclosed produces a thread on a workpiece in a fully automatic mode, which thread may be internal or external, having any desired pitch. There are no limitations on threading internal threads which do not pass through the workpiece or producing external threads adjacent flanges or shoulders. All threads are precisely formed and are perfectly parallel to the longitudinal axis of the workpiece. While production of a right-hand thread has been illustrated, it will be understood that a left-hand thread may be produced with required changes obvious to one skilled in the art. If a tapered thread, either internal or external is desired, the threading device of the present invention will be mounted so that its longitudinal axis is offset from the longitudinal axis of the workpiece to an appropriate degree.

Should it be desired to thread longer workpieces, the simple design of the present invention requires, within certain limits, only that the following be lengthened: screw 48, the operating length of first pneumatic cylinder 36, and support guide 30; with all other parts being unchanged. With any given screw 48, any length thread may be formed, from a fraction of an inch to the full length of the screw.

From the above discussion, it will be understood that not only may a single given screw 48 be employed for a wide range of thread lengths, but it may be employed, as well, in the cutting of threads having a range of pitches, all by making simple adjustments without having to change components of threading device 10. For these reasons, screw 48 may be considered to be a "master rotating drive screw."

It will thus be seen that the objects set forth above, among those made apparent from the preceding description, are efficiently attained and, since certain changes may be made in the above construction without departing from the scope of the invention, it is intended that all matter contained in the above description or shown on the accompanying drawing figures shall be interpreted as illustrative only and not in a limiting sense.

It is also to be under stood that the following claims are intended to cover all of the generic and specific features of the invention herein described and all statements of the scope of the invention which, as a matter of language, might be said to fall therebetween.

I claim:

1. A threading device for attachment to a lathe comprising:
   (a) support means for fixedly mounting said threading device on said lathe;
   (b) holding means for holding a cutting tool in position relative to a rotating part to be threaded;
   (c) longitudinal carriage means, slideably mounted on said support means, for moving said cutting tool along a surface to be threaded of said rotating part;
   (d) transversal carriage means upon which said holding means is fixedly mounted, slideably mounted on said longitudinal carriage means, for moving said cutting tool into said surface;
   (e) rotating screw means, mounted on said support means, geared to rotate at a selected fixed ratio to the rotation of said rotating part;
   (f) screw engaging means, fixedly mounted with respect to said longitudinal carriage means, adapted to engage said rotating screw means, thereby to move said longitudinal carriage means and thereby move said cutting tool along said surface to cut a groove therein;
   (g) stop means fixedly mounted with respect to said screw means;
   (h) variable stop means rotatably mounted with respect to said support means and geared to rotate at a selected fixed ratio with respect to said screw means, said variable stop means being adjustable to ensure that said cutting tool will engage the thread being cut in said rotating part; and
   (i) control means fixedly mounted with respect to said longitudinal carriage means to control movement of said longitudinal carriage means and said transversal carriage means, said control means engaging said stop means when said cutting tool has reached the end of a threading pass and engaging said variable stop means when to initiate a threading pass.

2. A threading device for attachment to a lathe or the like, comprising:
   (a) support means for fixedly mounting said threading device on said lathe or the like;
   (b) holding means for holding a cutting tool in position relative to a rotating part to be threaded;
   (c) longitudinal carriage means, slideably mounted on said support means, for moving said cutting tool along the surface to be threaded of said rotating part;
   (d) transvérsal carriage means upon which said holding means is fixedly mounted, slideably mounted on said longitudinal carriage means, for moving said cutting tool into said surface;

(e) rotating screw means, mounted on said support means, geared to rotate at a selected fixed ratio to the rotation of said rotating part;
(f) screw engaging means, fixedly mounted with respect to said longitudinal carriage means, adapted to engage said rotating screw means, thereby to move said longitudinal carriage means and thereby move said cutting tool along said surface to cut a groove therein;
(g) first pneumatic means mounted on said longitudinal carriage means and connected to cause said screw engaging means to engage said screw;
(h) shaft means rotatably mounted in said transversal carriage means;
(i) unidirectional clutch means fixedly mounted to said shaft means;
(j) second pneumatic means mounted on said longitudinal carriage means and connected to cause said transversal carriage means to advance a selected increment of distance into said surface, said second pneumatic means having disposed therein second piston means;
(k) cam means fixedly mounted on said unidirectional clutch means to engage said second piston means and cause said unidirectional clutch to rotate when said second piston moves in one direction;
(l) circular cam means fixedly mounted on said shaft means; and
(m) cam stop means fixedly mounted on said longitudinal carriage means to engage said circular cam, thereby terminating movement of said transversal carriage toward said workpiece.

* * * * *